US011659261B2

United States Patent
Herman et al.

(10) Patent No.: US 11,659,261 B2
(45) Date of Patent: May 23, 2023

(54) VEHICLE OPTICAL SENSOR MOTION CORRECTION

(71) Applicant: Ford Global Technologies, LLC, Dearborn, MI (US)

(72) Inventors: David Michael Herman, Oak Park, MI (US); Venkatesh Krishnan, Canton, MI (US); Catherine Marie Amodeo, Livonia, MI (US); Maher Ghneim, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/406,155

(22) Filed: Aug. 19, 2021

(65) Prior Publication Data

US 2023/0054134 A1 Feb. 23, 2023

(51) Int. Cl.
*H04N 23/45* (2023.01)
(52) U.S. Cl.
CPC .................................. *H04N 23/45* (2023.01)
(58) Field of Classification Search
CPC .... H04N 5/2258; H04N 23/68; H04N 23/681; H04N 23/6811; H04N 23/682; H04N 23/683; H04N 23/684; H04N 23/689
See application file for complete search history.

(56) References Cited

U.S. PATENT DOCUMENTS

| 8,824,741 | B2 * | 9/2014 | Walter ................. B60W 40/112 |
| | | | 348/148 |
| 10,083,501 | B2 | 9/2018 | Stuart et al. |
| 2010/0315505 | A1 * | 12/2010 | Michalke ................ G06T 7/251 |
| | | | 348/118 |
| 2014/0350834 | A1 * | 11/2014 | Turk ......................... B60R 1/00 |
| | | | 701/300 |
| 2020/0041647 | A1 | 2/2020 | Danziger et al. |
| 2020/0304737 | A1 | 9/2020 | Sakano |
| 2020/0349723 | A1 * | 11/2020 | Geva .......................... G06T 7/73 |

OTHER PUBLICATIONS

Schwertz, "Useful Estimations and Rules of Thumb for Optomechanics", University of Arizona, May 7, 2010.

* cited by examiner

*Primary Examiner* — Michael E Teitelbaum
(74) *Attorney, Agent, or Firm* — Frank A. MacKenzie; Bejin Bieneman PLC

(57) ABSTRACT

A computer includes a processor and a memory storing instructions executable by the processor to receive optical data from an optical sensor of a vehicle, adjust the optical data using an adjustment model, measure a first value from the optical data over a duration, predict a second value from the optical data over the duration based on the first value, measure the second value from the optical data over the duration, and modify the adjustment model using the predicted second value and the measured second value. The first value and the second value are time-varying and aggregated from the optical data per time step.

19 Claims, 6 Drawing Sheets

VEHICLE OPTICAL SENSOR MOTION CORRECTION

BACKGROUND

Autonomous or semi-autonomous vehicles typically include optical sensors. The optical sensors detect the external world, e.g., objects and/or characteristics of surroundings of the vehicle, such as other vehicles, road lane markings, traffic lights and/or signs, pedestrians, etc. For example, the optical sensors can include radar sensors, scanning laser range finders, light detection and ranging (LIDAR) devices, and image processing sensors such as cameras. For autonomous and semi-autonomous vehicles, a computer can be programmed to operate the vehicle independently of the intervention of a human operator, completely or to a lesser degree, based on inputs that can include data received from the optical sensors.

DETAILED DESCRIPTION

Figure 1:
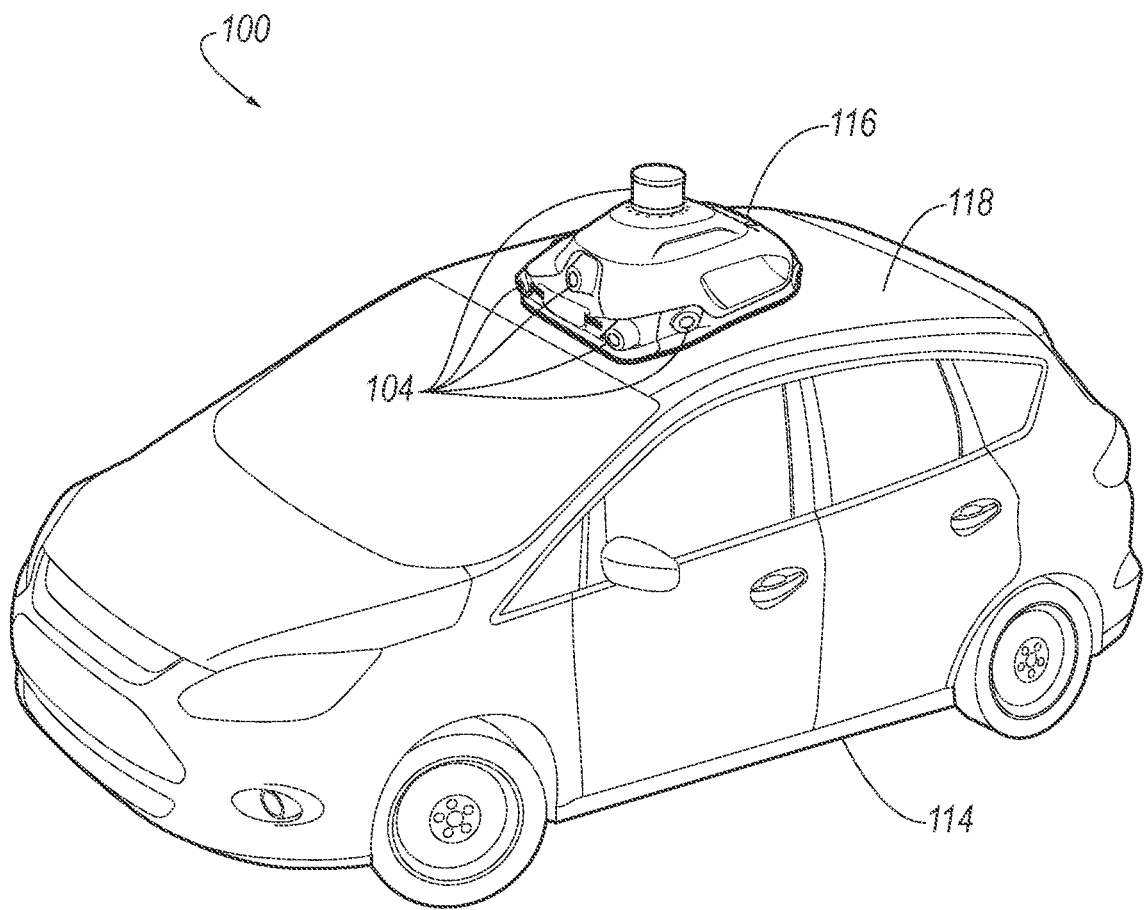
FIG. 1 is a perspective view of an example vehicle with optical sensors.

Optical sensors on a vehicle generate optical data that a computer of the vehicle can use for operating the vehicle. For the optical data to be usable by the computer, the optical sensors may need to have tight tolerances for motion relative to a body of the vehicle, e.g., for how much the optical sensor can twist, tilt, bounce, etc. compared to the body or to other sensors mounted on the body. One way to address the tight tolerance is to use a mounting structure for the optical sensors that has a high stiffness. Limiting the sensor motion can be achieved with higher stiffness materials, e.g., carbon fiber composites, with thicker components, or with added components for reinforcement, any of which can add complexity and/or weight. Also, a higher stiffness can increase shocks transmitted from the body to the optical sensor.

This disclosure provides a way to address the tolerances for the optical sensor in addition to or in lieu of increasing stiffness. A computer receiving the optical data can adjust the optical data using an adjustment model, which predicts the motion of the optical sensor relative to the vehicle based on the motion of the vehicle. For example, the adjustment model can be a physics-based model of the connection between the optical sensor and the body of the vehicle. The adjustment can incorporate mechanical excitations to the body of the vehicle from traveling over a road surface and correlations with changes in sensor output that would indicate a dynamic misalignment state.

Moreover, this disclosure describes how to correct for motion of the optical sensor relative to the body that results from a change to the connection between the optical sensor and the body. For example, a shock to the vehicle can jar a connector for the optical sensor loose, wear over time can widen a range of motion of the optical sensor relative to the body, etc. The computer can predict a second value from the optical data based on a first value from the optical data and also measure the second value. A comparison of the predicted second value and the measured second value can be characteristic of a particular type and extent of change to the optical sensor. The comparison can thus be used to modify the adjustment model. Because both the first value and the second value are measured from the optical data, no additional sensors are needed for modifying the adjustment model.

A computer includes a processor and a memory storing instructions executable by the processor to receive optical data from an optical sensor of a vehicle, adjust the optical data using an adjustment model, measure a first value from the optical data over a duration, predict a second value from the optical data over the duration based on the first value, measure the second value from the optical data over the duration, and modify the adjustment model using the predicted second value and the measured second value. The first value is time-varying and aggregated from the optical data per time step. The second value is time-varying and aggregated from the optical data per time step.

The instructions may further include instructions to receive motion data from a motion sensor of the vehicle over the duration, and adjusting the optical data using the adjustment model may be based on the motion data. Adjusting the optical data using the adjustment model may include correcting at least one of distortion or alignment.

The motion sensor may include an accelerometer.

Modifying the adjustment model may be based on the motion data. The instructions may further include instructions to determine a type of event affecting the optical sensor based on the motion data, the predicted second value, and the measured second value, and modifying the adjustment model may be based on the type of the event. The type of the event may be based on a correlation between the motion data and a mathematical function of the measured second value. The mathematical function may be a difference of the measured second value and the predicted second value.

The adjustment model may be a model of motion of the optical sensor relative to the vehicle resulting from motion of the vehicle.

The second value may have a greater sensitivity to motion of the vehicle than the first value.

Modifying the adjustment model may be performed using a difference of the measured second value and the predicted second value.

The instructions may further include instructions to perform an autocorrelation on a mathematical function of the measured second value, and refrain from modifying the adjustment model in response to the autocorrelation being below a threshold. The mathematical function may be a difference of the measured second value and the predicted second value.

The instructions may further include instructions to, upon determining that the modified adjustment model does not adjust the optical data more accurately than the unmodified adjustment model, output a notification to service the vehicle.

The instructions may further include instructions to, upon identifying a change point for a mathematical function of the measured second value, output a notification to service the vehicle.

The mathematical function may be a difference of the measured second value and the predicted second value.

The instructions may further include instructions to, before measuring the first value, filter a plurality of conditions from the optical data.

The optical sensor may be one of a camera, a radar, or a LIDAR.

The optical sensor may be a first camera of a pair of stereo cameras including the first camera and a second camera, and the first value and second value may be mathematical functions of a disparity map of image data from the stereo cameras.

A vehicle includes a body an optical sensor rigidly mounted to the body, and a computer communicatively coupled to the optical sensor. The computer is programmed to receive optical data from the optical sensor, adjust the optical data using an adjustment model, measure a first value from the optical data over a duration, predict a second value from the optical data over the duration based on the first value, measure the second value from the optical data over the duration, and modify the adjustment model using the predicted second value and the measured second value. The first value is time-varying and aggregated from the optical data per time step. The second value being time-varying and aggregated from the optical data per time step.

With reference to the Figures, wherein like numerals indicate like parts throughout the several views, a computer 102 includes a processor and a memory storing instructions executable by the processor to receive optical data from an optical sensor 104 of a vehicle 100, adjust the optical data using an adjustment model 106, measure a first value from the optical data over a duration, predict a second value from the optical data over the duration based on the first value, measure the second value from the optical data over the duration, and modify the adjustment model 106 using the predicted second value and the measured second value. The first value and the second value are time-varying and aggregated from the optical data per time step.

With reference to FIG. 1, the vehicle 100 may be any suitable type of ground vehicle, e.g., a passenger or commercial automobile such as a sedan, a coupe, a truck, a sport utility, a crossover, a van, a minivan, a jeepney, a taxi, a bus, etc.

The vehicle 100 may be an autonomous vehicle. The computer 102 can be programmed to operate the vehicle 100 independently of the intervention of a human operator, completely or to a lesser degree. The computer 102 may be programmed to operate a propulsion 108, a brake system 110, a steering system 112, and/or other vehicle systems based at least in part on the optical data from the optical sensors 104. For the purposes of this disclosure, autonomous operation means the computer 102 controls the propulsion 108, brake system 110, and steering system 112 without input from a human operator; semi-autonomous operation means the computer 102 controls one or two of the propulsion 108, brake system 110, and steering system 112 and a human operator controls the remainder; and nonautonomous operation means a human operator controls the propulsion 108, brake system 110, and steering system 112.

The vehicle 100 includes a body 114. The vehicle 100 may be of a unibody construction, in which a frame and the body 114 of the vehicle 100 are a single component. The vehicle 100 may, alternatively, be of a body-on-frame construction, in which the frame supports the body 114 that is a separate component from the frame. The frame and the body 114 may be formed of any suitable material, for example, steel, aluminum, etc.

The vehicle 100 includes at least one optical sensor 104, e.g., a plurality of optical sensors 104. The optical sensors 104 generate optical data from receiving electromagnetic radiation, e.g., radio waves, infrared radiation, visible light, etc. The optical sensors 104 can be any suitable type for detecting objects spaced from the vehicle 100, e.g., radar sensors, scanning laser range finders, light detection and ranging (LIDAR) devices, and/or image processing sensors such as cameras. For example, the optical sensors 104 can include cameras such as charge-coupled devices (CCD), complementary metal oxide semiconductors (CMOS), etc. For another example, the optical sensors 104 can include a pair of stereo cameras including a first camera and a second camera. For another example, the optical sensors 104 can include a LIDAR, which detects distances to objects by emitting laser pulses at a particular wavelength and measuring the time of flight for the pulse to travel to the object and back. For another example, the optical sensors 104 can include a radar, which can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. A radar can return distances to object as well as radial velocity, i.e., the component of velocity toward or away from the radar. The optical sensors 104 could also include cameras for different wavelengths of electromagnetic radiation, cameras that detect polarization, time-of-flight cameras, event-based cameras, light-field cameras, etc.

The optical sensors 104 are rigidly mounted to the body 114 of the vehicle 100. For example, the vehicle 100 can include a housing 116 mounted on a roof 118 or other body panel of the body 114 of the vehicle 100 and supporting the optical sensors 104. The housing 116 may be shaped to be attachable to the roof 118, e.g., may have a shape matching a contour of the roof 118. The housing 116 may be attached to the roof 118, which can provide the optical sensors 104 mounted inside the housing 116 with an unobstructed field of view of an area around the vehicle 100. Alternatively or additionally, the optical sensors 104 can be mounted to the windshield, front fascia, corner fascia, rear fascia, rear liftgate, etc. The housing 116 may be formed of, e.g., plastic or metal.

Figure 2:
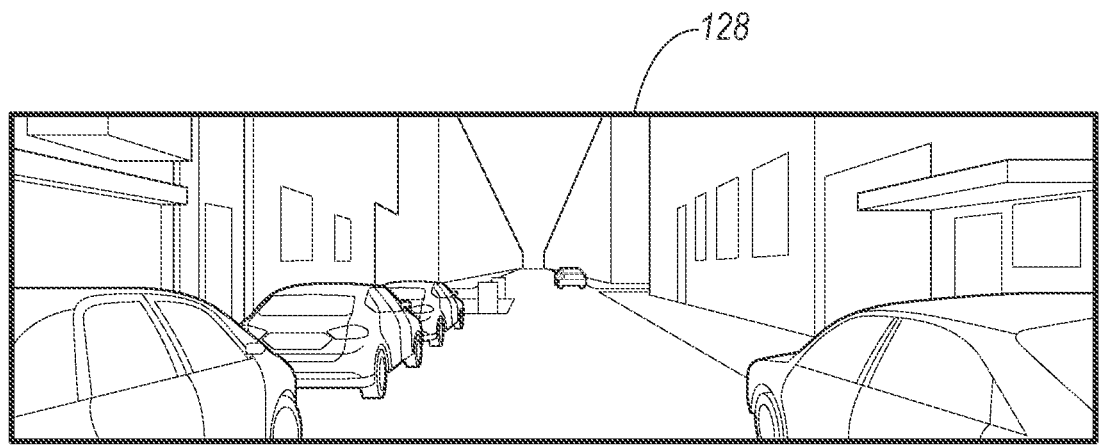
FIG. 2 is an example image frame and disparity map from the optical sensors.
Figure 2:
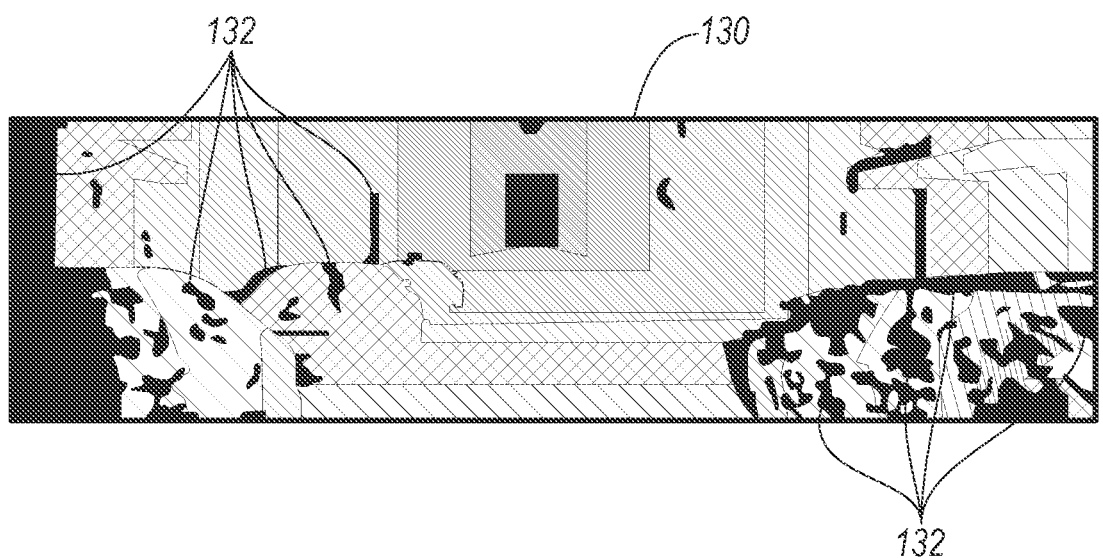

With reference to FIG. 2, the optical data can be, e.g., image data from a camera, a disparity map 130 generated from image data from a pair of stereo cameras, a point cloud from a LIDAR, etc. For example, FIG. 2 shows an image frame 128 of image data from a camera in the top panel and a corresponding disparity map 130 in the bottom panel generated from two image frames 128 including the image frame 128 in the top panel. The image data can be a sequence of the image frames 128 of the fields of view of the respective optical sensors 104, or portions of the image frames 128 such as a subset of rows as produced by a rolling-shutter effect. Each image frame 128 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame 128 or disparity map 130, e.g., position in the field of view of the optical sensor 104 at the time that the image frame 128 was recorded, can be specified in pixel dimensions or coordinates, e.g., an ordered pair of pixel distances, such as a number of pixels from a top edge and a number of pixels from a left edge of the image frame 128.

Figure 3:
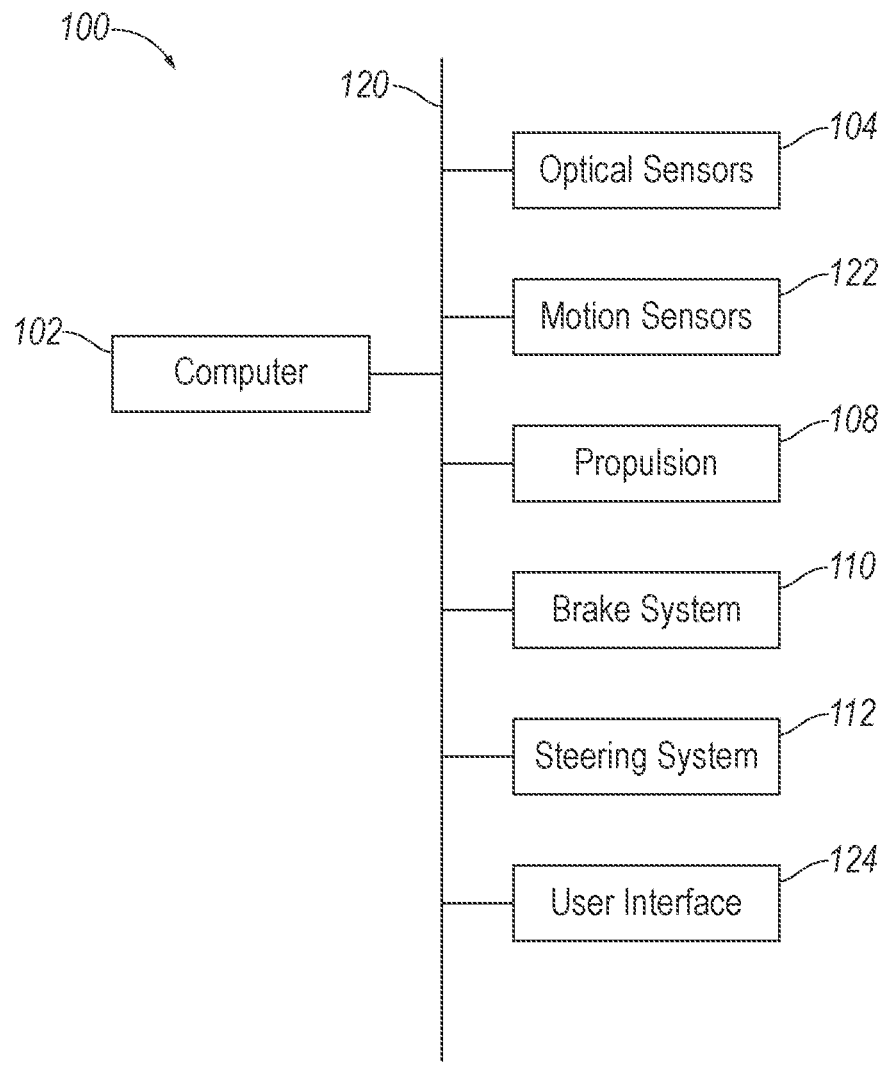
FIG. 3 is a block diagram of the vehicle.

With reference to FIG. 3, the computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 120 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the optical sensors 104, motion sensors 122, the propulsion 108, the brake system 110, the steering system 112, a user interface 124, and other components via the communications network 120.

The vehicle 100 includes the motion sensors 122. The motion sensors 122 provide motion data, i.e., data indicating motion of the vehicle 100. For example, the motion sensors 122 may detect the location and/or orientation of the vehicle 100, linear and rotational velocity of the vehicle 100, acceleration of the vehicle 100, etc. For example, the motion sensors 122 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. For another example, the motion sensors 122 may provide data about operation of systems of the vehicle 100 controlling the motion, i.e., the propulsion 108, the brake system 110, and/or the steering system 112, e.g., wheel speed, wheel orientation, steering angle, braking force, etc.

The propulsion 108 of the vehicle 100 generates energy and translates the energy into motion of the vehicle 100. The propulsion 108 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 108 can include an electronic control unit (ECU) or the like that is in communication with and receives input from the computer 102 and/or a human operator. The human operator may control the propulsion 108 via, e.g., an accelerator pedal and/or a gear-shift lever.

The brake system 110 is typically a conventional vehicle braking subsystem and resists the motion of the vehicle 100 to thereby slow and/or stop the vehicle 100. The brake system 110 may include friction brakes such as disc brakes, drum brakes, band brakes, etc.; regenerative brakes; any other suitable type of brakes; or a combination. The brake system 110 can include an electronic control unit (ECU) or the like that is in communication with and receives input from the computer 102 and/or a human operator. The human operator may control the brake system 110 via, e.g., a brake pedal.

The steering system 112 is typically a conventional vehicle steering subsystem and controls the turning of the wheels. The steering system 112 may be a rack-and-pinion system with electric power-assisted steering, a steer-by-wire system, as both are known, or any other suitable system. The steering system 112 can include an electronic control unit (ECU) or the like that is in communication with and receives input from the computer 102 and/or a human operator. The human operator may control the steering system 112 via, e.g., a steering wheel.

The user interface 124 presents information to and receives information from an occupant of the vehicle 100. The user interface 124 may be located, e.g., on an instrument panel in a passenger cabin of the vehicle 100, or wherever may be readily seen by the occupant. The user interface 124 may include dials, digital readouts, screens, speakers, and so on for providing information to the occupant, e.g., human-machine interface (HMI) elements such as are known. The user interface 124 may include buttons, knobs, keypads, microphone, and so on for receiving information from the occupant.

Figure 4:
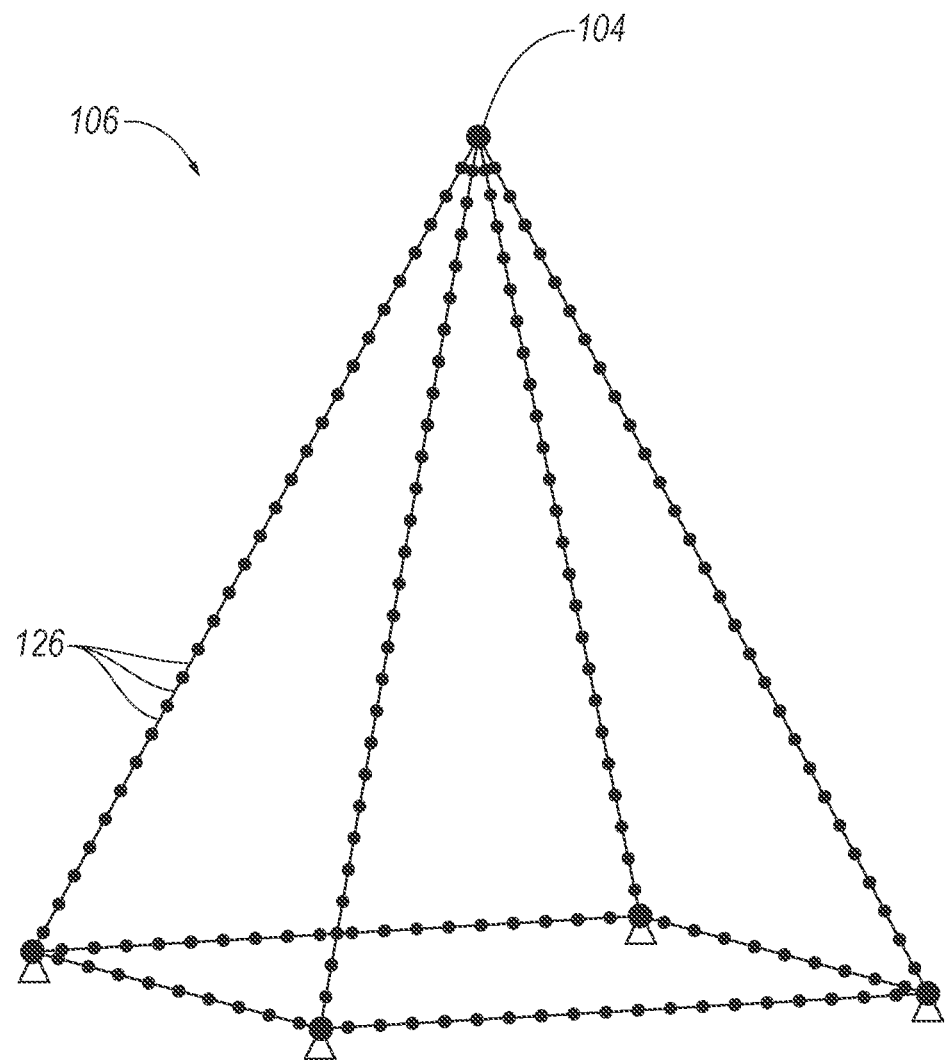
FIG. 4 is a diagram of an example adjustment model of motion of the optical sensors relative to the vehicle.

With reference to FIG. 4, the computer 102 receives the optical data from the optical sensors 104 and then adjusts the optical data using the adjustment model 106. For the purposes of this disclosure, an "adjustment model" is a transformation of optical data into different optical data based on other data. The adjustment model 106 can correct for distortion and/or misalignment of the optical sensors 104. Adjusting the optical data using the adjustment model 106 can be based on the motion data from the motion sensors 122. For example, the adjustment model 106 can be a model of motion of the optical sensor 104 relative to the vehicle 100 resulting from motion of the vehicle 100. For example, the adjustment model 106 can be a physics-based model such as based on finite-element analysis and/or based on an approximation using ideal elements of the attachment of the optical sensors 104 to the body 114 using the housing 116, e.g., four ideal beams 126 connecting the optical sensor 104 to the body 114, e.g., the roof 118 of the vehicle 100. The adjustment model 106, e.g., finite-element analysis, can use geometry of the attachment of the optical sensors 104, boundary conditions, and/or the motion data. For example, the adjustment model 106 can track motion of the optical sensors 104 in one or more degrees of freedom, e.g., six degrees of freedom or three rotational degrees of freedom. Using three rotational degrees of freedom without linear degrees of freedom can be computationally less intensive that using six degrees of freedom while still capturing the relevant effects. Furthermore, discrete time steps of the adjustment model 106 may further be interpolated or extrapolated to the corresponding time frame of the optical data from the optical sensors 104, e.g., time steps for global-shutter effect, rolling-shutter frame-by-frame exposure time, update times for event-based cameras, timeframes for beam steering for a LIDAR, etc.

Before measuring the first value, the computer 102 can filter a plurality of conditions from the optical data. The filtering can be applied before, after, or coincident with the adjustment model 106. The conditions can be known distortions or misalignments stored in the memory of the computer 102, e.g., caused by operations of the vehicle 100 such as activating a blower in the housing 116, etc. The computer 102 can receive data indicating that the condition is met, e.g., that the blower is activated, and filter the optical data by applying a transformation that is stored in the memory of the computer 102 to the optical data.

Returning to FIG. 2, the computer 102 measures the first value over the duration. The first value is time-varying, i.e., has a potentially different value at each time step of the optical data, e.g., in each image frame 128 or each subset of rows of the image frame 128 produced with a rolling-shutter effect or each disparity map 130. The first value is aggregated, i.e., generated by collecting from a portion of the optical data and applying a mathematical function to output a reduced amount of data such as a scalar value. Using a scalar value aggregated from the optical data can permit quick processing by the computer 102. The aggregation is per time step, i.e., each instance of the first value is produced at a single time step that the optical data is generated. For example, the first value can be a statistic from a disparity map 130 such as a quantity of not-a-number (NAN) pixels in the disparity map 130, a quantity of feature points in the disparity map 130, etc. NAN pixels 132 in a disparity map 130 occur when the pixels in one image frame 128 lack corresponding pixels in the other image frame 128. FIG. 2 shows an image frame 128 from the optical sensor 104 that is a camera in a stereo pair of cameras at top and a corresponding disparity map 130 from the stereo pair of cameras at bottom, with the black regions of the disparity map 130 representing NAN pixels 132. The first value can be measured over a subset of the optical data, e.g., from a middle portion of the image frame 128 or disparity map 130, e.g., with 10 percent of a width of the image frame 128 or disparity map 130 removed from the left and right edges and 10 percent of a height of the image frame 128 or disparity map 130 removed from the top and bottom edges of the image frame 128 or disparity map 130. The duration over which the first value is measured can be chosen to provide a representative sample for the first value.

The computer 102 also measures the second value over the duration. The second value is also time-varying and aggregated from the optical data per time step. The second value can also be a mathematical function of the optical data, e.g., the disparity map 130, e.g., outputting a scalar value. The second value can be a different aggregated quantity from the optical data. The second value can have a greater sensitivity to motion of the vehicle 100 than the first value, i.e., a given movement of the vehicle 100 generates a greater percentage change in the second value than in the first value. For example, the second value can be a quantity of NAN pixels near the edges of the image frame 128 or disparity map 130, e.g., with 10 percent of a height from the top or bottom edges or within 10 percent of a width from the left or right edges of the image frame 128 or disparity map 130.

The computer 102 can predict the second value over the duration based on the first value. For example, the computer 102 can use a statistical correlation between the first value and the second value measured with test data, a machine-learning program such as a neural net trained on test data, etc. For another example, the computer 102 can use a physics-based model of a relationship between the first value and the second value. This model can be derived from or related to the adjustment model 106 above.

The predicted second value can be compared with the measured second value. The relationship between the predicted second value and the measured second value can be characteristic of a type of sensor event, as described below. The relationship between the predicted second value and the measured second value can capture temporary and/or permanent changes to the adjustment model 106, e.g., by determining that the basis or assumptions underlying the adjustment model 106 and the predicted second value have changed. This determination can be helped by the difference in sensitivity to motion of the vehicle 100 of the first value and the second value.

For example, the computer 102 can calculate a mathematical function of the predicted second value and the measured second value, e.g., of a relationship between the predicted second value and the measured second value, e.g., a difference of the predicted second value and the measured second value, i.e., $f(t)=x_2^*(t)-x_2(t)$, in which $x_2$ is the measured second value, $x_2^*$ is the predicted second value, and $t$ is time. The mathematical function can instead be a different function of the relationship between the predicted second value and the measured second value, e.g., a ratio, etc.

Figure 5:
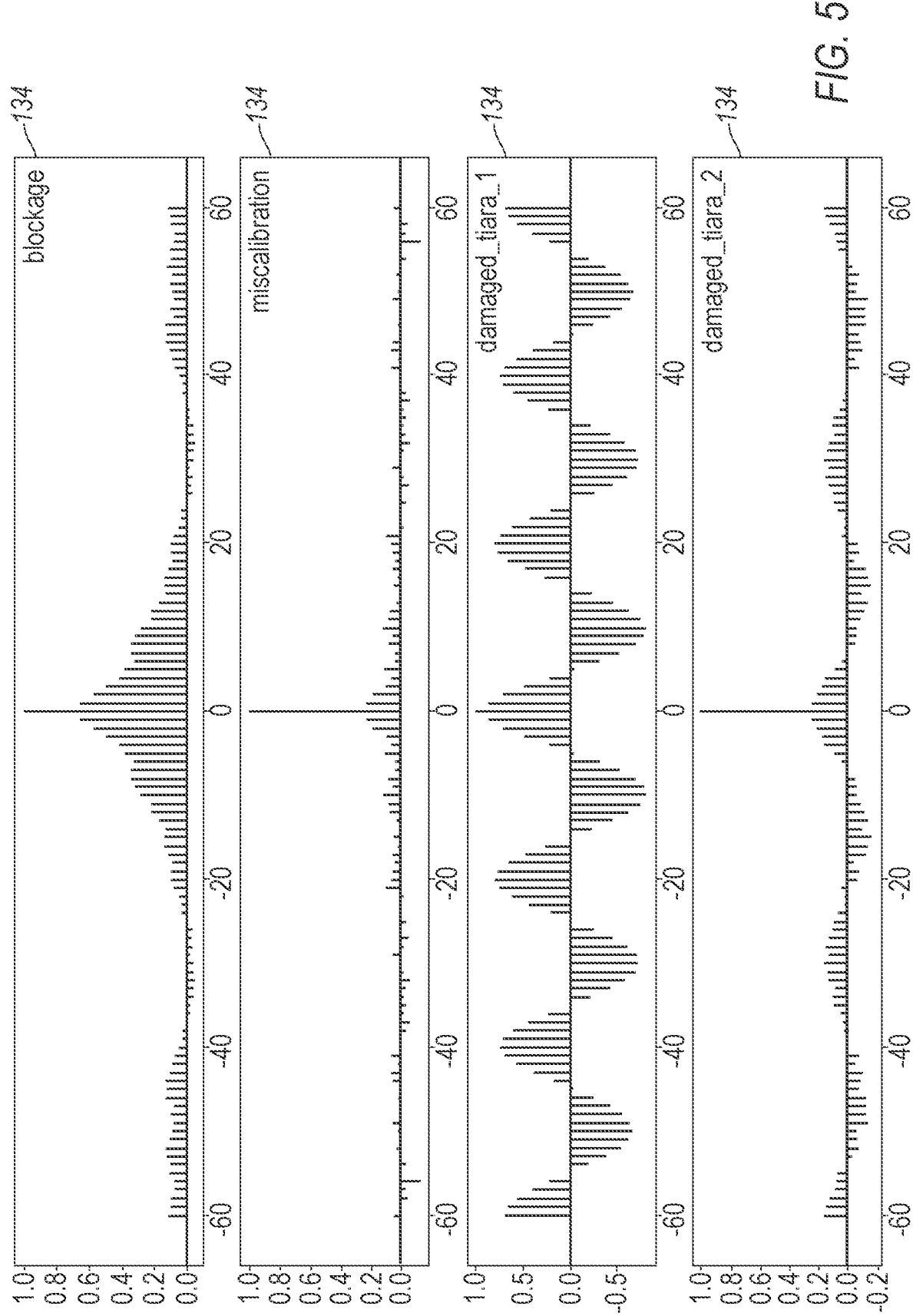
FIG. 5 is a plurality of example autocorrelations of optical data from the optical sensors.

With reference to FIG. 5, the computer 102 can perform a statistical test for autocorrelation on the mathematical function of the measured second value and the predicted second value, e.g., on the difference between the measured second value and the predicted second value. An autocorrelation is a correlation of a time-varying value with a delayed copy of the same time-varying value. FIG. 5 shows a plurality of autocorrelation plots 134. The horizontal axes are values for the delay between the mathematical function and the delayed copy of the mathematical function, which is measured in units of time, and the vertical axes are the correlation coefficient at each value for the delay. The autocorrelation plots 134 can be characteristic of the type of sensor event. The autocorrelation can have a magnitude, a mode, a frequency, etc. The computer 102 can select a timeframe over which to perform the autocorrelation based on detecting features of the motion data, e.g., a mechanical excitation above a threshold, and based on known dampening properties of the vehicle 100, which determine how long the mechanical excitation will affect the vehicle 100.

The computer 102 can perform one or more correlations over the duration of the mathematical function with the motion data. For example, the computer 102 can perform correlations of the mathematical function with longitudinal acceleration of the vehicle 100, with vertical motion of the vehicle 100, roll of the vehicle 100, etc. The correlations are tests of a statistical relationship between the mathematical function and the motion data, e.g., a linear relationship measured with Pearson's correlation coefficient, cross-correlation using Fourier analysis, etc.

The computer 102 can perform a change-point detection over the duration on the mathematical function of the measured second value and the predicted second value. Change-point detection is the identification of a change in the probability distribution of a time series. The computer 102 can use any suitable technique for online change-point detection, e.g., a sequential-analysis approach, Bayesian change detection, streaming algorithms, etc. The change-point detection can indicate whether an event affecting the optical sensors 104 has occurred.

An event affecting the optical sensors 104 is some occurrence that causes the optical data to temporarily or permanently differ from what the optical data would be if the adjustment model 106 were accurate, and a type of event is a qualitative categorization of the event. An event may or may not be marked by a change point. Examples of events affecting the optical sensors 104 include a partial blockage of a field of view of one of the optical sensors 104, a miscalibration of one of the optical sensors 104, a deformation of a component connecting one of the optical sensors 104 to the body 114, a loosening of one of the optical sensors 104 relative to the body 114, etc. The effects of such events can be detected using the analysis described above, and those effects can be mitigated or responded to as described below.

The computer 102 can determine the type of the event affecting the optical sensors 104 based on the motion data, the predicted second value, and the measured second value. For example, the type of the event can be based on the correlation between the motion data and the mathematical function of the predicted second value and the measured second value, and alternatively or additionally the type of the event can be based on autocorrelation and the motion data, such as the magnitude, mode, and/or frequency of the autocorrelation. The computer 102 can determine the type of the event using a machine-learning algorithm. The machine-learning algorithm can be any suitable type for classifying the detected changes, e.g., into a type on a known list of types, e.g., Bayesian classifiers, nearest-neighbor classifiers, linear or polynomial classifiers, artificial neural networks, etc. The autocorrelation and/or the correlations can be inputs to the machine-learning algorithm. The machine-learning algorithm can be trained on sample matched motion data and optical data with known types of changes. The sample data can be pre-processed with the correlations and autocorrelation described above.

The computer 102 can modify the adjustment model 106 based on the motion data, the predicted second value, and the measured second value. For example, the computer 102 can modify the adjustment model 106 using the type of the event, the difference between the measured second value and the predicted second value, the autocorrelation, the correlations, etc. Modifying the adjustment model 106 can be performed by, e.g., changing weights of elements of a physics-based model, such as reducing a stiffness of an ideal beam 126 based on an increased looseness of the optical sensor 104.

Figure 6:
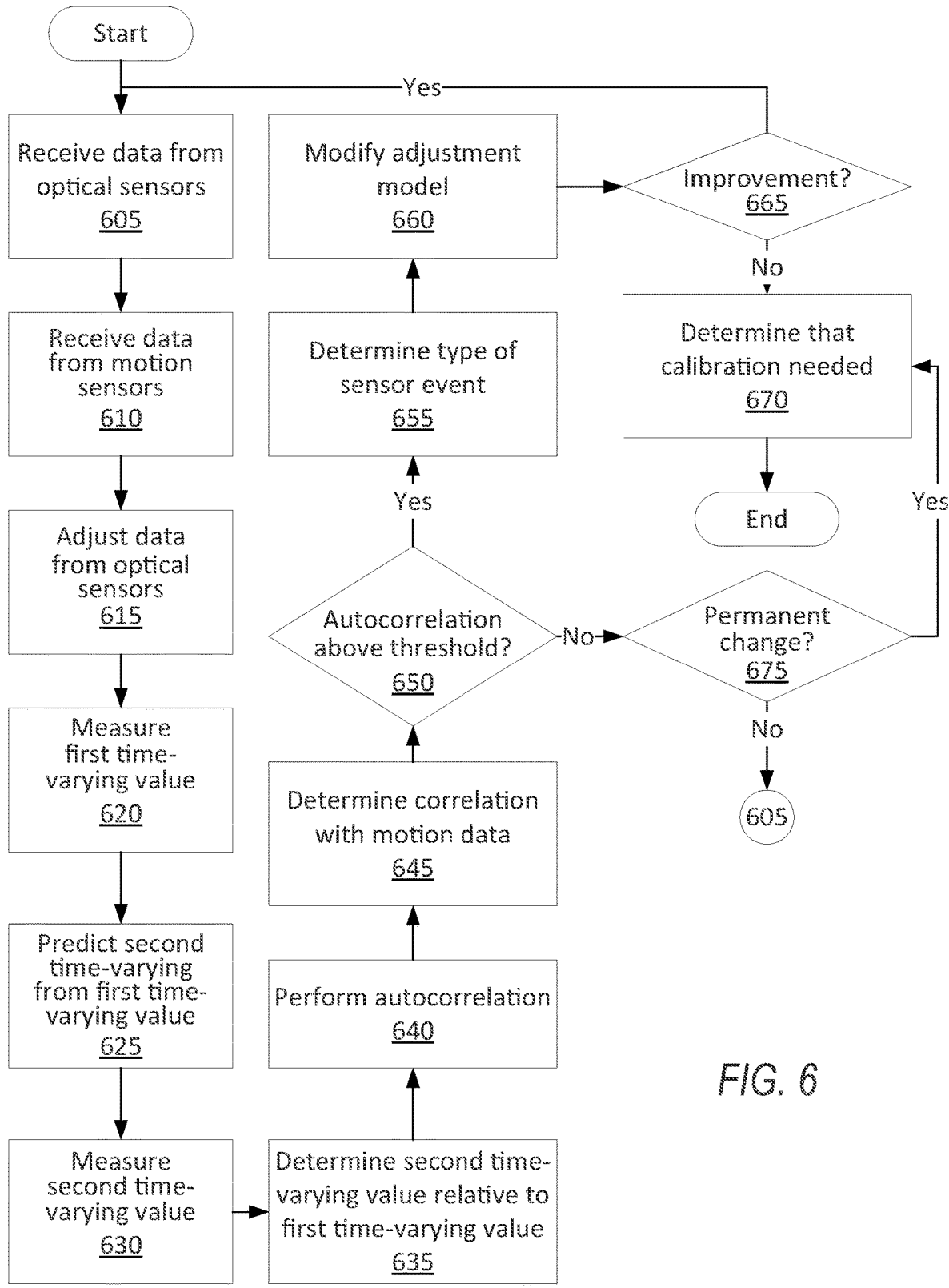
FIG. 6 is an example process flow diagram of an example process for adjusting the optical data.

FIG. 6 is a process flow diagram illustrating an exemplary process 600 for adjusting the optical data. The memory of the computer 102 stores executable instructions for performing the steps of the process 600 and/or programming can be implemented in structures such as mentioned above. As a general overview of the process 600, the computer 102 receives the optical data and the motion data, adjusts the optical data using the adjustment model 106, measures the first value, predicts the second value, measures the second value, determines the difference between the predicted second value and the measured second value, performs the autocorrelation, and performs the correlations with the motion data. In response to the autocorrelation being above a threshold, the computer 102 determines the type of the event and modifies the adjustment model 106. If the modified adjustment model 106 does not adjust the optical data more accurately than the unmodified adjustment model 106, the computer 102 outputs a notification to service the vehicle 100. In response to the autocorrelation being below the threshold, if the computer 102 identifies a change point, the computer 102 outputs a notification to service the vehicle 100. The process 600 can continue for as long as the vehicle 100 is on.

The process 600 begins in a block 605, in which the computer 102 receives the optical data from the optical sensors 104 for the duration.

Next, in a block 610, the computer 102 receives the motion data from the motion sensors 122 for the duration.

Next, in a block 615, the computer 102 adjusts the optical data using the adjustment model 106 and filters the plurality of conditions from the optical data, as described above.

Next, in a block 620, the computer 102 measures the first value over the duration, as described above.

Next, in a block 625, the computer 102 predicts the second value over the duration based on the first value, as described above.

Next, in a block 630, the computer 102 measures the second value over the duration, as described above.

Next, in a block 635, the computer 102 determines the mathematical function of the measured second value and the predicted second value, e.g., the difference of the measured second value and the predicted second value, as described above.

Next, in a block 640, the computer 102 performs the autocorrelation on the mathematical function, as described above.

Next, in a block 645, the computer 102 determines the correlations of the mathematical function with the motion data, as described above.

Next, in a decision block 650, the computer 102 determines whether the autocorrelation is above a threshold. For example, the threshold can be whether the autocorrelation is statistically significant. In response to the autocorrelation being above the threshold, e.g., being statistically significant, the process 600 proceeds to a block 655. In response to the autocorrelation being below the threshold, e.g., not being statistically significant, the process 600 proceeds to a decision block 675, and the computer 102 thereby refrains from modifying the adjustment model 106.

In the block 655, the computer 102 determines the type of the event affecting the optical sensors 104 based on the motion data, the predicted second value, and the measured second value, as described above.

Next, in a block 660, the computer 102 modifies the adjustment model 106, as described above.

Next, in a decision block 665, the computer 102 determines whether the modified adjustment model 106, i.e., the adjustment model 106 as modified in the block 660, adjusts the optical data more accurately than the unmodified adjustment model 106, i.e., the adjustment model 106 before being modified in the block 660. The computer 102 can use the optical data gathered over the duration in the block 605 or can use new optical data gathered after the duration. The computer 102 can compare the accuracy of the modified and unmodified adjustment models 106 by, e.g., determining which of the modified adjustment model 106 and unmodified adjustment model 106 generates a smaller difference between the predicted second value and the measured second value. Upon determining that the modified adjustment model 106 adjusts the optical data more accurately, the process 600 returns to the block 605 to continue monitoring the optical data. Upon determining that the modified adjustment model 106 does not adjust the optical data more accurately, the process 600 proceeds to a block 670.

In the block 670, the computer 102 instructs one or more components of the vehicle 100 to perform mitigation actions. For example, the computer 102 can output a notification to service the vehicle 100, e.g., by actuating the user interface 124. For another example, the computer 102 can instruct the vehicle 100 to autonomously navigate to a service depot, e.g., by actuating the propulsion 108, the brake system 110, and the steering system 112 according to known autonomous-operation algorithms For another example, the computer 102 can actuate the vehicle 100 to perform a minimal risk maneuver to put the vehicle 100 in a minimal risk condition. For purposes of this disclosure, a "minimal risk maneuver" is a maneuver that puts the vehicle 100 in a minimal risk condition, and "minimal risk condition" has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human operator fails to respond appropriately to a request to take over the dynamic driving task." (U.S. Dept. of Transportation & NHTSA, Automated Driving Systems 2.0: A Vision for Safety, at 26 (citing SAE International J3016, International Taxonomy and Definitions for Terms Related to Driving Automation Systems for On-Road Motor Vehicles 100 (J3016:September 2016)).) For example, the minimal risk maneuver may be initiating a handover to the human operator or autonomously driving the vehicle 100 to a halt at a roadside, i.e., stopping the vehicle 100 outside active lanes of traffic. The computer 102 may perform the minimal risk maneuver by using known autonomous-operation algorithms After the block 670, the process 600 ends.

In response to the autocorrelation being below the threshold, e.g., not being statistically significant, in the decision block 650, the process 600 proceeds to the decision block 675. In the decision block 675, the computer 102 attempts to identify a change point for the mathematical function, as described above. Upon failing to identify a change point, the process 600 returns to the block 605 to continue monitoring the optical data. Upon identifying a change point, the process 600 proceeds to the block 670.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
receive optical data from an optical sensor of a vehicle;
adjust the optical data using an adjustment model;
measure a first value from the optical data over a duration, the first value being time-varying and aggregated from the optical data per time step;
predict a second value from the optical data over the duration based on the first value, the second value being time-varying and aggregated from the optical data per time step;
measure the second value from the optical data over the duration;
receive motion data from a motion sensor of the vehicle over the duration;
determine a type of event affecting the optical sensor based on the motion data, the predicted second value, and the measured second value; and
modify the adjustment model using the predicted second value and the measured second value;
wherein adjusting the optical data using the adjustment model is based on the motion data;
modifying the adjustment model is based on the motion data;
modifying the adjustment model is based on the type of the event; and
the type of the event is based on a correlation between the motion data and a mathematical function of the measured second value.

2. The computer of claim 1, wherein adjusting the optical data using the adjustment model includes correcting at least one of distortion or alignment.

3. The computer of claim 1, wherein the motion sensor includes an accelerometer.

4. The computer of claim 1, wherein the mathematical function is a difference of the measured second value and the predicted second value.

5. The computer of claim 1, wherein the second value has a greater sensitivity to motion of the vehicle than the first value.

6. The computer of claim 1, wherein modifying the adjustment model is performed using a difference of the measured second value and the predicted second value.

7. The computer of claim 1, wherein the instructions further include instructions to perform an autocorrelation on a second mathematical function of the measured second value, and refrain from modifying the adjustment model in response to the autocorrelation being below a threshold.

8. The computer of claim 7, wherein the second mathematical function is a difference of the measured second value and the predicted second value.

9. The computer of claim 1, wherein the instructions further include instructions to, upon determining that the modified adjustment model does not adjust the optical data more accurately than the unmodified adjustment model, output a notification to service the vehicle.

10. The computer of claim 1, wherein the instructions further include instructions to, upon identifying a change point for a second mathematical function of the measured second value, output a notification to service the vehicle.

11. The computer of claim 10, wherein the second mathematical function is a difference of the measured second value and the predicted second value.

12. The computer of claim 1, wherein the instructions further include instructions to, before measuring the first value, filter a plurality of conditions from the optical data.

13. The computer of claim 1, wherein the optical sensor is one of a camera, a radar, or a LIDAR.

14. The computer of claim 1, wherein the optical sensor is a first camera of a pair of stereo cameras including the first camera and a second camera, and the first value and second value are mathematical functions of a disparity map of image data from the stereo cameras.

15. A vehicle comprising:
a body;
an optical sensor rigidly mounted to the body; and
a computer communicatively coupled to the optical sensor;
wherein the computer is programmed to:
receive optical data from the optical sensor;
adjust the optical data using an adjustment model;
measure a first value from the optical data over a duration, the first value being time-varying and aggregated from the optical data per time step;
predict a second value from the optical data over the duration based on the first value, the second value being time-varying and aggregated from the optical data per time step;
measure the second value from the optical data over the duration;
receive motion data from a motion sensor of the vehicle over the duration;
determine a type of event affecting the optical sensor based on the motion data, the predicted second value, and the measured second value; and
modify the adjustment model using the predicted second value and the measured second value; and
wherein adjusting the optical data using the adjustment model is based on the motion data;
modifying the adjustment model is based on the motion data;
modifying the adjustment model is based on the type of the event; and
the type of the event is based on a correlation between the motion data and a mathematical function of the measured second value.

16. A computer comprising a processor and a memory storing instructions executable by the processor to:
receive optical data from an optical sensor of a vehicle;
adjust the optical data using an adjustment model;
measure a first value from the optical data over a duration, the first value being time-varying and aggregated from the optical data per time step;
predict a second value from the optical data over the duration based on the first value, the second value being time-varying and aggregated from the optical data per time step;
measure the second value from the optical data over the duration; and
modify the adjustment model using the predicted second value and the measured second value;
wherein the second value has a greater sensitivity to motion of the vehicle than the first value.

17. A computer comprising a processor and a memory storing instructions executable by the processor to:
  receive optical data from an optical sensor of a vehicle;
  adjust the optical data using an adjustment model;
  measure a first value from the optical data over a duration, the first value being time-varying and aggregated from the optical data per time step;
  predict a second value from the optical data over the duration based on the first value, the second value being time-varying and aggregated from the optical data per time step;
  measure the second value from the optical data over the duration; and
  modify the adjustment model using the predicted second value and the measured second value;
  wherein modifying the adjustment model is performed using a difference of the measured second value and the predicted second value.

18. A computer comprising a processor and a memory storing instructions executable by the processor to:
  receive optical data from an optical sensor of a vehicle;
  adjust the optical data using an adjustment model;
  measure a first value from the optical data over a duration, the first value being time-varying and aggregated from the optical data per time step;
  predict a second value from the optical data over the duration based on the first value, the second value being time-varying and aggregated from the optical data per time step;
  measure the second value from the optical data over the duration;
  modify the adjustment model using the predicted second value and the measured second value; and
  upon determining that the modified adjustment model does not adjust the optical data more accurately than the unmodified adjustment model, output a notification to service the vehicle.

19. A computer comprising a processor and a memory storing instructions executable by the processor to:
  receive optical data from an optical sensor of a vehicle;
  adjust the optical data using an adjustment model;
  measure a first value from the optical data over a duration, the first value being time-varying and aggregated from the optical data per time step;
  predict a second value from the optical data over the duration based on the first value, the second value being time-varying and aggregated from the optical data per time step;
  measure the second value from the optical data over the duration;
  modify the adjustment model using the predicted second value and the measured second value; and
  upon identifying a change point for a mathematical function of the measured second value, output a notification to service the vehicle.

* * * * *